United States Patent Office 3,567,771
Patented Mar. 2, 1971

3,567,771
DIBASIC ACID
Herbert L. Wehrmeister, Terre Haute, Ind., assignor to Commercial Solvents Corporation, New York, N.Y.
No Drawing. Filed Feb. 27, 1967, Ser. No. 619,042
Int. Cl. C07c 65/02
U.S. Cl. 260—521                                      1 Claim

ABSTRACT OF THE DISCLOSURE

This application relates to 2-(5-carboxypentyl)-4,6-dimethoxybenzoic acid and to a method for its preparation.

---

This invention relates to a new chemical compound and to its preparation. More particularly this invention relates to a new chemical compound, 2-(5-carboxypentyl)-4,6-dimethoxybenzoic acid and to a method for its preparation.

The product of this invention, 2-(5-carboxypentyl)-4,6-dimethoxybenzoic acid, is useful in a variety of different chemical applications. It may be used, for example, to provide new plasticizers, gelatinizing agents, swelling agents and softeners for synthetic resins and high polymer compounds as described in U.S. Pat. No. 2,862,956 to Gundel et al. Other compounds can be prepared from it which are useful as additives for lubricants and as fixatives for perfumes.

Methoxybenzene dicarboxylic acids have been found by Burkhard, United States Letters Patent No. 2,894,934, to be particularly useful in the preparation of synthetic polyester resins since they are compatible with and soluble in polyhydric alcohols and permit the esterification reaction between those two compounds and dihydric alcohols to take place rapidly and without the necessity of solvents. The polyester resins so produced exhibit improved hydrolytic stability and have uses as insulation for conductors used in magnet wires.

The unsaturated esters of methoxybenzene dicarboxylic acids, e.g. the mono- or divinyl or mono- or diallyl esters, which may be produced by the addition of acetylene or allyl alcohol in conventional process steps, can be readily polymerized with conventional olefin polymerization catalysts. The high polymer products have been found by Burnett, United States Letters Patent No. 2,821,-520 to have substantially improved properties.

The 2-(5-carboxypentyl)-4,6-dimethoxybenzoic acid of this invention is also useful in the production of polyamide type resins by condensation with a diamine compound using the techniques of Burkhard, United States Letters Patent No. 2,902,475. Polyamid resins have gained acceptance as fiber forming materials and the polymer products of alkoxybenzene dicarboxylic acids have higher melting points and hydrolytic stability.

The preparation of the compound of this invention is described specifically in the following examples wherein the starting material, referred to as FES, has the following structure:

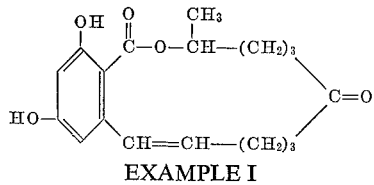

EXAMPLE I

Two 10 gram portions of FES each in 200 ml. of acetic acid were catalytically reduced at room temperature in the presence of 1.2 grams PdO at a hydrogen pressure of about 45 p.s.i. The combined reduction mixtures were heated to boiling, filtered, and the filter cake was washed with 50 ml. of hot acetic acid. The cooled filtrate was added with stirring to 2 liters of water. The mixture was stirred for 15 minutes and the white solid was collected by filtration, washed with 3× 10 ml. of water and dried finaly in a vacuum desiccator to yield 19.1 grams of dihydro FES, M.P. 191–193°, described in United States Letters Patent 3,239,354.

EXAMPLE II

Dihydro FES (556 milligrams) was dissolved in 25 ml. of 10% NaOH plus 10 ml. of water. To the stirred solution were added three two milliter portions of methyl sulfate at half hour intervals. Stirring was continued for an additional hour. The acidic mixture was made alkaline by the addition of 10 ml. of 10% NaOH and stirred for one-half hour. The solid was collected by filtration, washed with 2× 25 ml. of water and dried in a vacuum desiccator. The product weighed 526 mg. and melted at 115–117°. Recrystallization from 10 ml. of water plus 25 ml. of ethanol gave 371 mg. of material, M.P. 124–125.5°, defined as dihydrodimethyl FES of the formula:

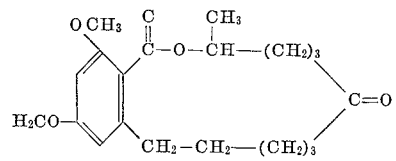

Analysis.—Calcd. for $C_{20}H_{28}O_5$ (percent): C, 68.95; H, 8.10; $OCH_3$, 17.81. Found (percent): C. 69.02; H, 8.12; $OCH_3$, 17.81.

EXAMPLE III

To a solution of 2.65 grams of dihydrodimethyl FES in 50 ml. of ethanol plus 40 ml. of pyridine was added 3.5 grams of hydroxylammonium chloride. The clear solution was refluxed for 2 hrs. and evaporated to a volume of 5–10 ml. Water (25 ml.) was added and the aqueous mixture was extracted with 3× 25 ml. of benzene. The dried extract was evaporated to dryness to yield 2.99 grams of a tacky white solid. Crystallization of this product from 10 ml. of $H_2O$ plus 15 ml. of ethanol gave 1.20 grams of material which melted at 126–128°. Recrystallization of 65 mg. of this material from aqueous ethanol gave 43 mg. of analytical material, M.P. 130–132°, designated as dihydrodimethyl FES oxime of the formula:

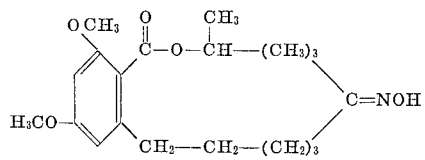

Analysis.—Calcd. for $C_{20}H_{29}NO_5$ (percent): C, 66.10; H, 8.04; N, 3.85. Found (percent): C, 66.52; H, 8.03; N, 3.91.

EXAMPLE IV

A cold (ice bath) solution of 4.0 grams of dihydrodimethyl FES oxime in 200 ml. of diethyl ether was added to a cold solution of 4.8 grams of $PCl_5$ in 200 ml. of diethyl ether. The mixture was stirred at ice bath temperature for one hour and at room temperature for two hours. The clear solution was left at room temperature overnight. The solution was then added with stirring to 600 ml. of ice water. Chloroform (50 ml.) was used to rinse out the flask. After stirring an additional 20 minutes the layers were separated and the aqueous layer was further extracted with 3×100 ml. of chloroform. The dried ether-chloroform solution was evaporated to dryness.

A second reaction was carried out as above and the two products were combined to yield 8.5 grams of amorphous material. Thin layer chromatography indicated this material to be of high purity and the same as material prepared somewhat similarly but crystallized to a M.P. of 119–121°. Infrared spectrum of this latter material was consistent for the lactam-lactone expected and analysis showed N, 3.63. Calcd. N, 3.85 for ether.

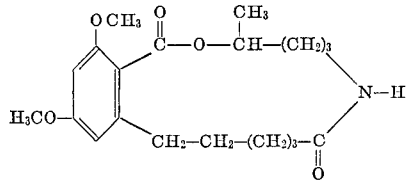

or

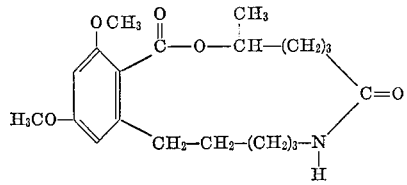

designated as the dihydrodimethyl FES oxime rearrangement product.

EXAMPLE V

To a solution of 6 grams of dihydrodimethyl FES oxime rearrangement product in 60 ml. of ethanol was added 60 ml. of 10% aqueous NaOH and the solution was heated at reflux for 64 hours.

The cooled mixture was diluted with 50 ml. of water and extracted with 5× 100 ml. of diethyl ether to remove neutral or basic materials. Examination of this ether extract by thin layer chromatography showed essentially only one component and that was unhydrolyzed lactam.

The aqueous alkaline solution was acidified by the addition of 20 ml. of 12 N $H_2SO_4$ and the acidic mixture was extracted with 5× 100 ml. of diethyl ether. The dried extract was evaporated to dryness finally in a vacuum desiccator. The residue weighed 1.49 grams. This residue was dissolved in 15 ml. of water plus 10 ml. of 10% NaOH and heated at reflux for 11½ hours. The cooled mixture was acidified and then extracted with 3× 25 ml. of diethyl ether. The dried extract was evaporated to dryness to yield 1.24 grams of an oil. This oil was combined with 0.5 grams of similar material (as shown by thin layer chromatography) from other experiments and dissolved in 100 ml. of diethyl ether. Cooling of this solution produced no crystals so it was evaporated to about 10 ml. and 25 ml. of n-hexane was added to the residue. The oil that separated did not dissolve on heating. Diethyl ether (50 ml.) was added and the mixture was again evaporated. An oil separated which solidified after scratching with a rod. This solid was collected, washed with 3× 10 ml. of n-hexane and dried in a vacuum desiccator to yield 1.28 grams of product, M.P. 106–110°. A portion of this material was recrystallized from cyclohexane-benzene to yield material for analysis, M.P. 111–112°.

Elemental analysis, nuclear magnetic resonance and mass spectra data show that the material is the compound 2-(5-carboxypentyl) - 4,6 - dimethoxybenzoic acid of the formula

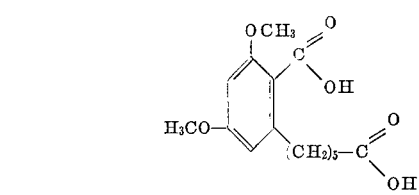

*Analysis.*—Calcd. for $C_{15}H_{20}O_6$ (percent): C, 60.80; H, 6.80. Found (percent): C, 60.88, 60.76, 61.00, 61.18; H, 6.46, 6.53, 6.58, 6.49.

I claim:
1. The compound 2-(5-carboxypentyl)-4,6-dimethoxybenzoic acid of the formula

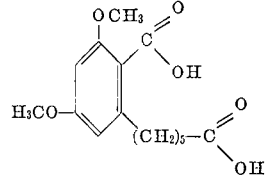

References Cited

Urry et al.: Tetrahedron Letters (27), 1966, pp. 3109–3114.

Huisgen et al.: Chemical Abstracts, vol. 62 (1965), p. 500 c.

Huisgen et al.: Chemical Abstracts, vol. 62 (1965), p. 498.

LORRAINE A. WEINBERGER, Primary Examiner

E. J. GLEIMAN, Assistant Examiner

U.S. Cl. X.R.
260—78